US010557540B2

(12) United States Patent
Ervin

(10) Patent No.: US 10,557,540 B2
(45) Date of Patent: Feb. 11, 2020

(54) FLEET ANGLE TOLERANT SHEAVE

(71) Applicant: National Oilwell Varco, L.P., Houston, TX (US)

(72) Inventor: Howard Ervin, Tomball, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 14/251,938

(22) Filed: Apr. 14, 2014

(65) Prior Publication Data
US 2015/0291403 A1 Oct. 15, 2015

(51) Int. Cl.
*F16H 55/50* (2006.01)
*B66D 3/08* (2006.01)
*B66D 1/36* (2006.01)

(52) U.S. Cl.
CPC ............. *F16H 55/50* (2013.01); *B66D 1/36* (2013.01); *B66D 3/08* (2013.01)

(58) Field of Classification Search
CPC ......... F16H 55/50; F16H 55/505; B66D 1/36; B66D 3/08; B66D 1/28; B66D 2700/0183
USPC ........................................................ 254/278
See application file for complete search history.

(56) References Cited

U.S. PATENT DOCUMENTS

| 432,701 | A | * | 7/1890 | Schultz | F16H 55/50 474/176 |
| 639,762 | A | | 12/1899 | Painter | |
| 829,898 | A | * | 8/1906 | Grimm | F16H 55/50 301/17 |
| 1,362,778 | A | | 12/1920 | Castino | |
| 1,369,319 | A | | 2/1921 | Guillaume | |
| 2,730,795 | A | | 1/1956 | Bloss | |
| 2,806,380 | A | * | 9/1957 | Martin | H02G 1/04 254/134.3 PA |
| 3,292,908 | A | * | 12/1966 | Thompson | A01K 89/015 254/398 |
| 3,385,563 | A | * | 5/1968 | Stinson, Jr. | H02G 1/04 254/415 |
| 3,512,757 | A | | 5/1970 | Ostrom | |

(Continued)

FOREIGN PATENT DOCUMENTS

| CA | 2287676 | 6/2000 |
| CA | 2874138 | 10/2015 |

(Continued)

OTHER PUBLICATIONS

Extended European Search Report for related European Application No. 15156151.1 dated Aug. 3, 2015 (7 pages).

(Continued)

*Primary Examiner* — Sang K Kim
*Assistant Examiner* — Nathaniel L Adams
(74) *Attorney, Agent, or Firm* — Schwegman Lundberg & Woessner, P.A.

(57) ABSTRACT

A sheave may include a body portion with a circular circumference and defining a center plane, a bore extending through the body portion and configured for receiving a shaft and allowing the body portion to rotate in the center plane, and a rope groove arranged on the circular circumference including a radiused bottom with a first end and a second end and a pair of opposing sidewalls each extending directly and tangentially from one of the first and second end and having a curved profile.

10 Claims, 3 Drawing Sheets

(56) References Cited

U.S. PATENT DOCUMENTS

| | | | | |
|---|---|---|---|---|
| 3,868,089 | A * | 2/1975 | Lindsey | B66C 13/12 254/134.3 PA |
| 3,934,482 | A * | 1/1976 | Byers | B63B 21/56 254/371 |
| 4,018,422 | A * | 4/1977 | Bozeman, Jr. | H02G 1/04 254/134.3 PA |
| 4,177,685 | A | 12/1979 | DeLancy | |
| 4,301,995 | A * | 11/1981 | Niskin | B66D 1/36 254/411 |
| 4,413,981 | A | 11/1983 | White et al. | |
| 4,480,818 | A * | 11/1984 | Frank | E21B 19/22 254/411 |
| 4,492,363 | A | 1/1985 | Niskin | |
| 4,936,549 | A | 6/1990 | Ivanov et al. | |
| 5,490,814 | A | 2/1996 | Whitenight | |
| 5,984,586 | A * | 11/1999 | Wudtke | B63B 21/16 114/293 |
| 6,041,476 | A * | 3/2000 | deNormand | E05D 13/1207 16/196 |
| 6,105,939 | A * | 8/2000 | Vance | B66D 1/36 254/405 |
| 6,881,166 | B1 | 4/2005 | Burkhardt et al. | |
| 7,036,393 | B2 | 5/2006 | Sakamaki | |
| 7,175,163 | B2 * | 2/2007 | Blanc | B66D 1/7405 254/278 |
| 7,798,471 | B2 * | 9/2010 | Christopher | B66D 1/52 114/243 |
| 8,398,057 | B2 * | 3/2013 | Tukachinsky | B66D 3/06 254/134.3 PA |
| 8,485,951 | B1 * | 7/2013 | Adams | A63B 21/04 224/403 |
| 8,973,901 | B2 * | 3/2015 | Roodenburg | B66D 1/7405 254/278 |
| 2004/0026676 | A1 | 2/2004 | Smith et al. | |
| 2005/0037880 | A1 | 2/2005 | Yoshikawa | |
| 2006/0000058 | A1 * | 1/2006 | Robertson | E05D 13/1207 16/197 |
| 2006/0231812 | A1 * | 10/2006 | Ziech | F16H 7/04 254/278 |
| 2008/0115414 | A1 * | 5/2008 | Hogan | A01G 27/003 47/66.6 |
| 2008/0161141 | A1 | 7/2008 | Joo et al. | |
| 2009/0291793 | A1 | 11/2009 | Marchesseault | |
| 2010/0133046 | A1 * | 6/2010 | Allwardt | B66B 7/08 187/251 |
| 2011/0118067 | A1 | 5/2011 | Bronson | |
| 2012/0204851 | A1 | 8/2012 | McPherson et al. | |
| 2014/0027691 | A1 * | 1/2014 | Ilaka | B66D 1/36 254/334 |
| 2014/0291030 | A1 * | 10/2014 | Urquhart | E21B 19/24 175/203 |
| 2015/0083879 | A1 * | 3/2015 | Hoffend, III | A63J 1/028 248/332 |

FOREIGN PATENT DOCUMENTS

| | | |
|---|---|---|
| CH | 641254 | 2/1984 |
| CN | 202251826 | 5/2012 |
| CN | 104976322 | 10/2015 |
| DE | 1900707 | 8/1970 |
| DE | 3426802 | 2/1986 |
| EP | 2447573 | 5/2012 |
| EP | 2933220 | 10/2015 |
| GB | 261207 | 11/1926 |
| GB | 285653 | 2/1928 |
| JP | 2000229789 | 8/2000 |
| WO | 2013038432 | 3/2013 |

OTHER PUBLICATIONS

Shehab, Khaled Mohamed. "Traveling Block and Crown Sheaves", Drilling Ahead World Oilfield Network, Apr. 15, 2012, accessed on the Internet Mar. 24, 2014 URL: <http://www.drillingahead.com/group/hse-drilling/forum/topics/traveling-block-and-crown-sheaves> (15 pages).

Screen shots from Google.com image search, Mar. 24, 2014 (1 page).

"Chinese Application Serial No. 201510173708.1, Office Action dated Dec. 5, 2018", W English Translation, 17 pgs.

"European Application Serial No. 15156151.1, Response filed Apr. 21, 2016 to Extended European Search Report dated Aug. 3, 2015", 33 pgs.

"European Application Serial No. 15156151.1, Communication pursuant to Article 94(3) EPC dated Aug. 22, 2016", 7 pgs.

"European Application Serial No. 15156151.1, Response filed Dec. 19, 2016 to Communication pursuant to Article 94(3) EPC dated Aug. 22, 2016", 10 pgs.

"European Application Serial No. 15156151.1, Communication pursuant to Article 94(3) EPC dated Apr. 9, 2018", 6 pgs.

"European Application Serial No. 15156151.1, Response filed Aug. 9, 2018 to Communication pursuant to Article 94(3) EPC dated Apr. 9, 2018", 6 pgs.

"Chinese Application Serial No. 201510173708.1, Response filed Feb. 19, 2019 to Office Action dated Dec. 5, 2018", w o English claims, 12 pgs.

"Chinese Application Serial No. 201510173708.1, Office Action dated Apr. 11, 2018", W O English Translation, 7 pgs.

"Chinese Application Serial No. 201510173708.1, Office Action dated Jun. 3, 2019", w English translation, 14 pgs.

\* cited by examiner

FLEET ANGLE TOLERANT SHEAVE

FIELD OF THE INVENTION

The present application relates to a sheave for use in handling lines, ropes, cables, or other flexible elongate tensile elements. More particularly, the present application relates to a sheave that can be used in a relatively more flexible manner when handling such lines, ropes, or cables. Still more particularly, the present application relates to a sheave for use with a block and tackle arrangement that accommodates conditions when the travelling block is positioned out from below or out of alignment with the crown block, which creates a fleet angle between the handling line and the plane of the sheave.

BACKGROUND OF THE INVENTION

Lifting assemblies such as those found on cranes and other material handling systems may include a crown block and a travelling block. Generally, the crown block is stationary relative to the supporting structure, which could be a crane boom, derrick, a bridge, a trolley, or some other aspect of the material handling system. In contrast, the travelling block may be movable generally upward and downward relative to the crown block by paying out or hauling in cable or rope. Each of the crown block and travelling block may include one or more sheaves and wire rope may be reeved around the sheaves between the crown block and the travelling block to create a block and tackle arrangement. The sheaves in the blocks may have grooves in them for controlling the position of the wire rope as it engages the sheave.

In the context of a drill rig, such as an oil drill rig, the crown block may be supported by a derrick and the traveling block may be suspended below the crown block and used for lifting and/or supporting tubulars in the well bore. A winch or drawworks may be connected to one end of the wire rope and may be used to raise and lower the travelling block. In some operations, such as when new sections of pipe are being lifted into place for example, the travelling block may be pulled horizontally and out from directly below the crown block. This may create a fleet angle between the wire rope and the plane of the sheave on either or both of the travelling and crown blocks. As may be appreciated, this fleet angle may cause the wire rope to hang up on the rim or lip of the sheave as it enters the sheave such that the wire rope intermittently slips into the groove rather than continuously feeding into the groove. This hang up and slippage can cause wear on the sheave and/or the rope leading to premature failure and replacement costs.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In some embodiments, a sheave may include a body portion with a circular circumference and defining a center plane. The sheave may include a bore extending through the body portion and the bore may be configured for receiving a shaft and may also be configured to allow the body portion to rotate in the center plane. The sheave may also include a rope groove arranged on the circular circumference. The rope groove may include a radiused bottom with a first end and a second end. The rope groove may also include a pair of opposing sidewalls each extending directly and tangentially from one of the first and second end and the sidewalls may have a curved profile.

In another embodiment, a block for use in a block and tackle arrangement may be provided. The block may include a body portion and a sheave may be arranged in the body portion for substantially free rotation. The sheave may define a center plane and may have a groove arranged along a circumference thereof. The groove may include a radiused bottom with a first end and a second end. The rope groove may also include a pair of opposing sidewalls each extending directly and tangentially from one of the first and second end and having a curved profile.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in some embodiments, relates to material handling systems employing crown blocks and/or travelling blocks that include fleet angle tolerant sheaves. The crown and travelling blocks may be part of a block and tackle arrangement where the crown and travelling blocks are connected to one another with one or more returning sections of wire rope. That is, wire rope may extend from a winch or draw works to the crown block, down to the travelling block, and back up to the crown block. As the wire rope passes through each block, it may be reeved around a separate sheave for each pass through the block. The sheaves in the blocks may have a uniquely shaped sheave groove. The sheave groove may be shaped to accommodate relatively high and/or frequent fleet angles that may otherwise cause the wire rope to hang up on the rim of the sheave and intermittently drop into the groove. Without this disclosed groove, this hanging up and slipping may often be heard by crews as the travelling block travels and the wire rope slips. That is, as the rope slips and the sheave drops slightly and reengages the rope with the bottom of the groove, the impact can and resulting tightening of the rope can be heard. This undesired rubbing and/or wear on the rim and sidewalls of the groove which can lead to premature failure or replacement of the sheaves and/or the wire rope.

In the oil industry, there are regulations and restrictions on the shape and profile of sheaves such as specified in American Petroleum Institute (API) 8A and 8C. The presently disclosed profile, in some embodiments, creates a sheave that can accommodate higher fleet angles while remaining in compliance with API 8A and 8C.

Figure 1:
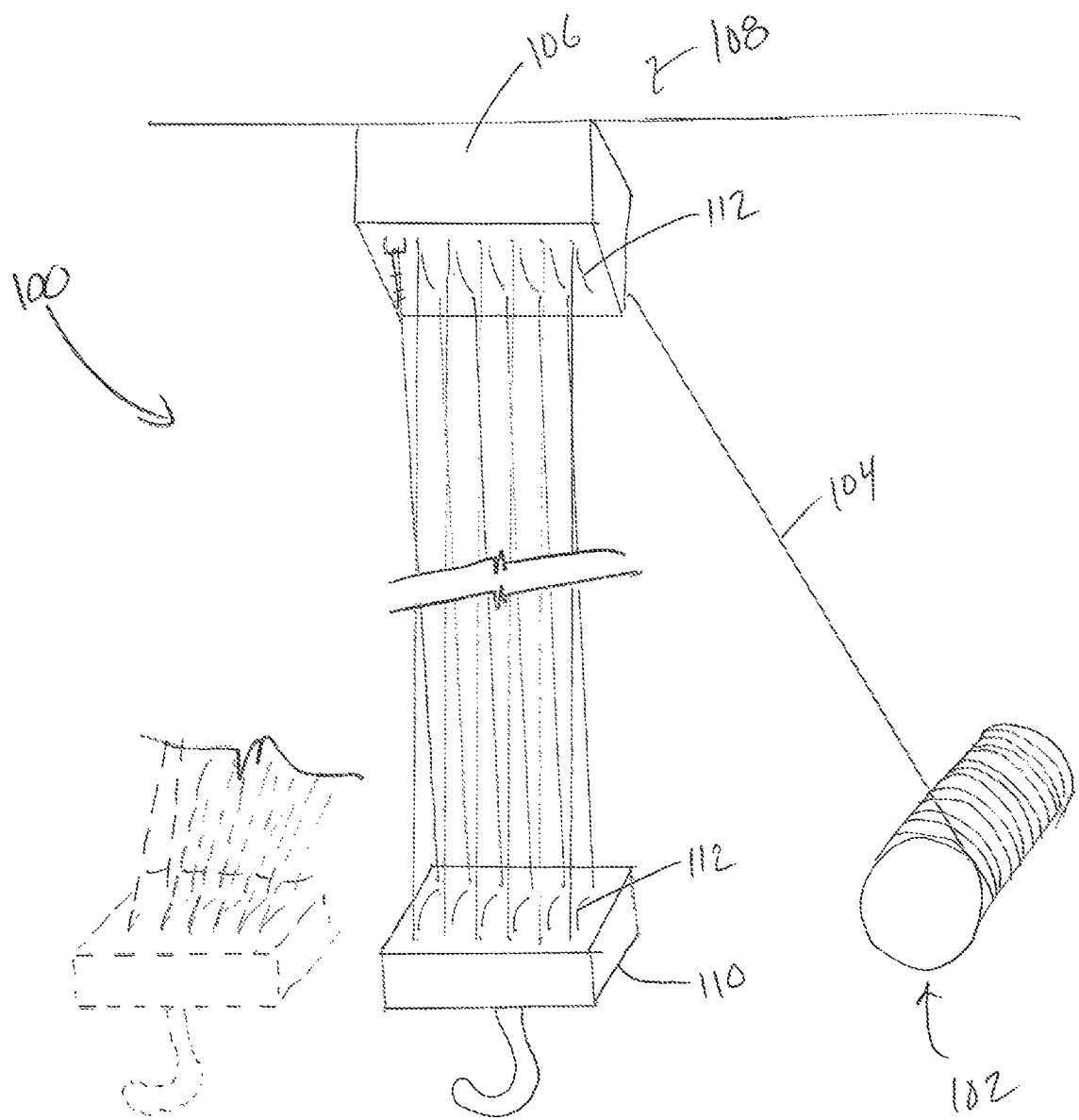
FIG. 1 is a perspective view a material handling system including a block and tackle arrangement, according to some embodiments.

As shown in FIG. 1, a simplified system 100 of a block and tackle arrangement in conjunction with a draw works 102 is shown. As shown, a portion of wire rope or other lifting line 104 may extend from the draw works 102 to the crown block 106. The crown block 106 may be supported by a derrick 108 or other supporting structure. The lifting line 104 may pass through the crown block 106 and extend down to the travelling block 110. In a single line set up, the lifting line 104 may be dead-ended at the travelling block 110. In other embodiments, as shown, the lifting line 104 may be reeved through the travelling block 110 across a sheave 112 and may return to the crown block 106. Each time the lifting line passes through the travelling block 110 or the crown block 106, the lifting line 104 may pass across a sheave 112 for guiding the line 104 through the block and allowing the line 104 to translate through the block as the travelling block 110 is lifted and/or lowered by hauling in or paying out, respectively, the lifting line 104. Depending on the number of returns from the travelling block 110, differing reeving patterns may be used. In the present embodiment, 12 lines are used including 6 lines extending downward from the crown block to the travelling block and 6 lines returning to the crown block. In other embodiments, 14 or 16 lines may be used or another number of lines may be used depending on the desired capacity of the system. In some embodiments, the crown block may be skewed slightly or the sheaves in the crown block may be skewed to accommodate the lateral translation of each line as it returns from the travelling block to the crown block and engages a sheave adjacent to the sheave that it previously passed across.

As shown in FIG. 1, in some circumstances, the travelling block 110 may be pulled out from below the crown block 106. For example, in some cases, the travelling block 110 may be lifted or lowered adjacent to tubulars in line with the well center to put the travelling block in position for the next anticipated operation. As the travelling block 110 is pulled out from below the crown block 106, as shown, the lifting lines 104 may become angled (i.e., fleet angle) as they exit the travelling block 110 causing the lifting line 104 to engage the outer lips of the grooves on the sheaves 112 in the block 110, causing the line 104 to ride along the lips of the grooves and intermittently drop into the groove. In some cases, both the travelling block 110 and the crown block 106 may experience wear due to the increased fleet angle, while in other embodiments, one or the other may experience the wear.

Figure 2:
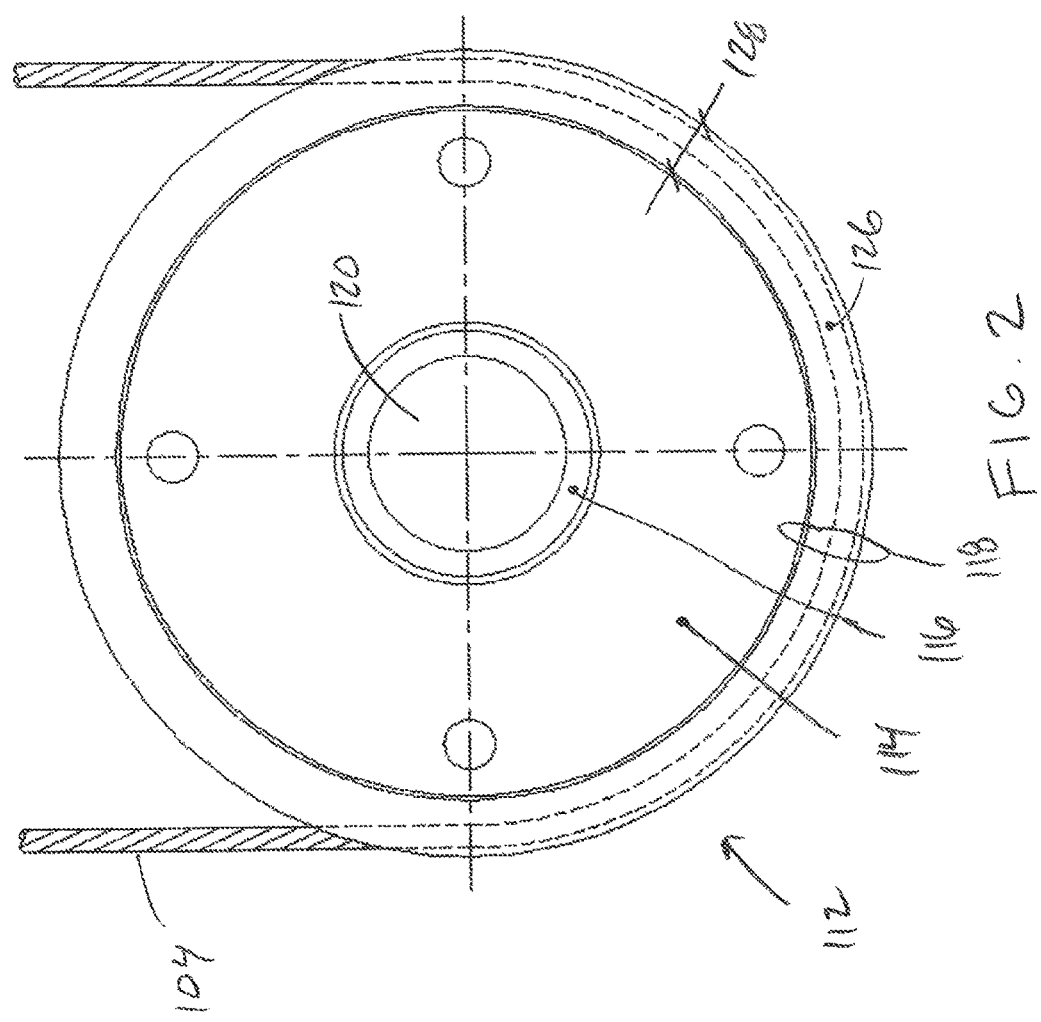
FIG. 2 is a side view of a sheave of the block shown in FIG. 1, according to some embodiments.

Referring now to FIG. 2, a sheave 112 of one of the crown and/or travelling block 106, 110 of FIG. 1 is shown. The sheave 112 may include a body portion or web 114, an axle engaging portion or hub 116, and a rope engaging portion or rim 118. As mentioned, the sheave 112 may be configured to guide a rope 104 passing through a crown or travelling block 106, 110. The sheave 112 may be particularly adapted to maintain the rope 104 in a substantially constant tension condition as it passes through the block and may also be adapted to reduce or minimize kinking or abrupt bends in the rope 104, which can lead to high stress concentrations and may create areas of fatigue or wear on the rope 104.

The body portion or web 114 of the sheave 112 may include a substantially robust structure configured for transferring tensile loads from the wire rope 104 to and through the axle engaging portion 116 of the sheave 112 to an axle or supporting structure of the sheave 112. Where the rope engaging portion 118 of the sheave 112 is substantially circular, the tensile load in the wire rope 104 may impart a substantially uniform and radially acting pressure along the rope engaging portion 118 of the sheave 112. Depending on the rigidity of the rope engaging portion 118 relative to the rigidity of the body portion 114, the body portion 114 may transfer the substantially uniform and radially acting pressure substantially directly inward to the axle. In other embodiments, where the body portion 114 is more akin to a spoke arrangement (either because it is relatively thin or because of an actual spoke-like structure), the rigidity of the rope engaging portion 118 may function more akin to a compressed hoop. In this embodiment, the deflection of the hoop under the load of the line 104 may create tension in the body portion 114 on the side of the body portion 114 opposite the load, thereby causing the body portion 114 to transfer the load to the axle engaging portion 116.

In some embodiments, the body portion 114 may be a substantially planar structure that is substantially circular such that the rope engaging portion 118 may be arranged substantially adjacent to the body portion 114 and immediately radially outward from the body portion 114. The body portion 114 may be substantially plate-like having a substantially constant thickness. In other embodiments, the thickness of the body portion 114 may be thicker near the center of the sheave 112 and around the axle engaging portion 116, for example. The body portion 114 may have one or more ribs arranged on its surface extending substantially radially outward from the center of the body portion 114 to the outer periphery of the body portion 114.

The axle engaging portion or hub 116 of the sheave 112 may be arranged immediately adjacent to the body portion 114 on an inner radial edge thereof. The axle engaging portion 116 of the sheave 112 may include a thickened collar extending through the thickness of the sheave 112 and defining a substantially cylindrical bore 120 in which a bearing or other friction reducing element may be placed and secured. The bore 120 may be sized to house such a bearing and allow an axle or other shaft, rod, pin, or support structure to pass through the bearing.

The rope engaging portion or rim 118 of the sheave 112 may be arranged along an outer periphery of the body portion 114 opposite the axle engaging portion 116. The rope engaging portion 118 may be adapted to cause the lifting line or rope 104 to conform to a selected shape (i.e., a radial arc shape) as it passes around the perimeter of the sheave 112. As such, and as shown in FIG. 2, the rope engaging portion 118 may include a generally circular shape when viewing the sheave 112 from the side. The diameter of the sheave 112 and, thus, the diameter of the rope engaging portion 118 may depend on several factors including the rope diameter, the design load, the block size, and several other factors. In some embodiments, the diameter of the rope engaging portion 118 (measured at outside or maximum diameter) may range from approximately 20 inches to approximately 114 inches or from approximately 40 inches to approximately 100 inches or from approximately 60 inches to approximately 80 inches.

Figure 3:
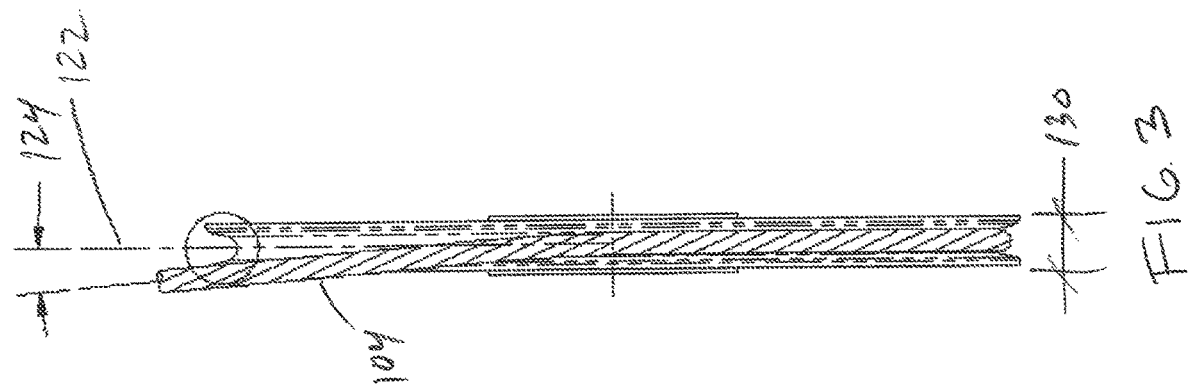
FIG. 3 is an edge view of the sheave of FIG. 3, according to some embodiments.

The rope engaging portion 118 may also be configured to cause the rope 104 to remain in alignment with a center plane 122 of the sheave 112 as it passes around the sheave 112. This may be particularly useful as the fleet angle 124 increases where sidewalls of the rope engaging portion 118 hold the rope generally centered on the sheave 112 as it passes around the sheave 112. As shown in FIG. 3, when viewed in cross-section, the rope engaging portion 118 may include a generally saddle or groove shape, for example. The rope engaging portion 118 may be defined by a base portion 126 extending around the periphery of the body portion 114. The base portion 126 may be thickened region around the periphery of the body portion 114 of the sheave 112 or the base portion 126 may have a thickness similar or the same as the body portion 114. In the latter case, the base portion 126 of the rope engaging portion 118 may be an outer annular portion of the body portion 114, for example. In the embodiment shown in FIG. 2, the base portion 126 is consistent with the former case where the base portion 126 includes a thickened region along the periphery of the body portion 114. The thickened region may have a radial height 128 sufficient to accommodate a groove which may be sized and shaped to accommodate a selected rope diameter or range of diameters. For example, in some embodiments, the radial height 128 of the base portion 126 may range from approximately 2⅜ inches to approximately 5 inches. The thickened region may have a width 130 when viewed in cross-section for accommodating the rope diameter and providing sidewalls along the sides of the rope. For example, in some embodiments, the width 130 may range from approximately 2⅜ inches to approximately 4½ inches.

Figure 4:
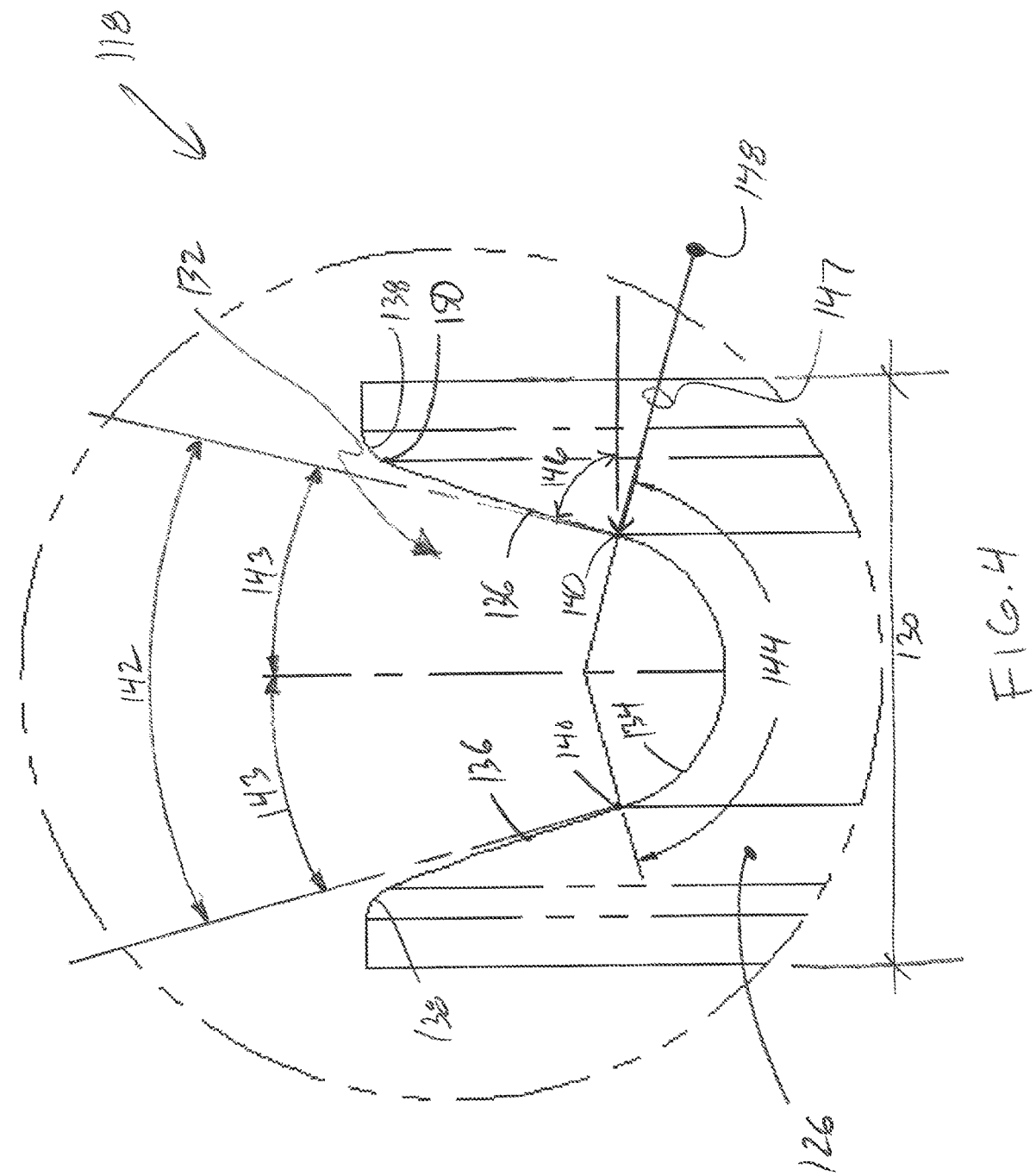
FIG. 4 is close-up view of a groove of the sheave of FIGS. 2 and 3, according to some embodiments.

Turning now to FIG. 4, a close-up view of a cross-section of the rope engaging portion is shown. As shown, the base portion 126 may include a groove 132 that is particularly configured to receive a circular diameter rope and may provide a seat for the rope as it lays on the outer peripheral surface of the sheave 112. In particular, the groove 132 may be defined by a bottom surface 134 and a pair of opposing sidewalls 136 each extending upwardly from the bottom surface 134 to respective lips 138.

The bottom surface 134 of the groove 132 may be adapted to nestably engage the lifting line or wire rope 104 as it presses against the sheave 112. The bottom surface 134 may thus be a concave surface extending between a pair of upper ends 140. The concave surface may have a curvature particularly adapted and modeled after the shape of the cross-section of the wire rope 104. In particular, the bottom surface 134 may have a curvature matching the curvature of the outer surface of the wire rope 104 or the curvature of the bottom surface 134 may be based on a radius slightly larger than the radius of the wire rope 104. For example, where the bottom surface curvature is too tight, the rope 104 may not fully engage the bottom surface 134 and may, instead, be hung up on the sidewalls 136 of the groove 132 causing excessive wear on the sidewalls 136 and pinching of the rope 104, which may cause the rope 104 to deteriorate. Where the bottom surface curvature is too broad, the rope 104 may have a tendency to flatten as it passes across the sheave 112, which may also cause the rope 104 to deteriorate more quickly. As such, the bottom surface curvature may be similar to the curvature of the outer surface of the wire rope 104. In some embodiments, the curvature may be defined by a radius that is based on the rope diameter multiplied by a factor ranging from approximately 1.01 to 1.2. In some embodiments, where the sheave groove is designed to meet API specifications, the factor may range from 1.06 to 1.1.

The bottom surface 134 may define an included angle 142 defining how much of the bottom surface 134 comes into contact with the surface of the wire rope. In some embodiments, the bottom surface 134 may have an included angle 142 ranging from approximately 0 degrees to approximately 60 degrees or from approximately 20 degrees to approximately 40 degrees or the included angle 142 may be approximately 30 degrees. In some embodiments, where sheaves 112 are designed to meet specification of the American Petroleum Institute (API) (e.g., API 8A and 8C), the included angle 142 may be approximately 30 degrees or the angle 144 subtended by the upper ends 140 may be approximately 150 degrees. Still other included angles 142 may be provided depending on the shape, size, and type of rope or lifting line being provided. In any of the above cases, the angle 146, relative to the horizontal of the upper end 140 of the bottom surface 134 may be approximately ½ of 180 degrees less the included angle 142. That is, where the included angle is 30 degrees, for example, the upper ends 140 of the bottom surface 134 may extend upwardly at an angle of approximately 75 degrees from the horizontal. In addition, as shown, the bottom surface of the groove may be symmetrical about the centerline of the sheave and, as such, the included angle 142 may be made up of two half angles 143 as shown.

The sidewalls 136 of the groove 132 may be adjacent and/or immediately adjacent to the upper ends 140 of the bottom surface 134 and may extend upwardly from the upper ends 140 of the bottom surface 134. As shown, the sidewalls 136 may initially be tangential to or in alignment with the upper ends 140 of the bottom surface 134 such that, initially, the sidewalls 136 extend upwardly from the horizontal at the same angle as the upper ends 140 of the bottom surface 134. In other embodiments, the sidewalls 136 might not be tangential and may, instead, extend at a shallower or more upright angle relative to the upper ends 140 of the bottom surface 134. Where sheaves are designed to meet API specifications, the sidewalls 136 may initially extend from the upper ends 140 of the bottom surface tangentially as shown.

As shown in FIG. 4, the sidewalls 136 may be curved or contoured sidewalls. That is, in contrast to groove profiles where the sidewalls are flat and extend tangentially upwardly from the bottom surface 134, the sidewalls 136 of FIG. 4 are not flat and, instead have a curved surface. As shown, while the sidewalls 136 may initially be tangential to the upper ends 140 of the bottom surface 134, the sidewalls 136 may have a curvature that may be defined by a radius 147. The curvature may be a generally convex curvature relative to the groove space 132 and, as such, may cause the sidewalls 136 to increasingly diverge away from the groove space 132 as the sidewalls 136 extend upwardly. That is, while flat sidewalls may be said to diverge as they extend upwardly, the present sidewalls increasingly diverge due to the curvature. The radius line of the curved sidewall 136 may extend substantially perpendicularly to the tangent point at the upper ends 140 of the bottom surface 134 and may have a center point 148 defined by the length of the radius 147. That is, for an included angle 142 of approximately 30 degrees and a sidewall curvature radius of R inches, the center point 148 of the radiused sidewall 136 may be R inches down and to the right of the upper end of the right upper sidewall at an angle of approximately 15 degrees. While a radiused curve has been described, in other embodiments, the curvature may be other parabolic curves, elliptical curves, or spiral shapes, for example. The amount of curvature of the sidewalls 136 may depend on a variety of factors including the rope diameter, the sheave diameter, and the desired fleet angle to be accommodated.

In some embodiments, depending on the rope diameter, the sheave diameter, and the desired fleet angle, the radius of the sidewalls may range from approximately 3 inches to approximately 30 inches or from approximately 4 inches to approximately 25 inches or from approximately 5 inches to approximately 21 inches. Any particular value within ranges mentioned may have particular advantages and may be selected. Still other radii outside or within the ranges described may be provided. In one example model, for a design fleet angle of 7 degrees, the following wall radii were determined:

| Rope Dia. | Wall Radius "R wall" (inches) | |
|---|---|---|
| | Sheave Diameter | |
| | 72 | 78 |
| 1.750 | 13.00 | 11.75 |
| 1.875 | 14.50 | 13.00 |
| 2.000 | 17.50 | 15.50 |
| 2.125 | 21.00 | 18.75 |
| 2.250 | 23.25 | 20.50 |

In addition, for a sheave diameter of 60 inches, for example, a wall radius ranging from 5⅝ inches to approximately 16 inches may be used. For example, with a sheave diameter of 60 inches and a rope diameter of 1⅛ inches, a wall radius of 5⅝ inches may provide for a fleet angle of 7 degrees.

It is to be appreciated that the wall radius may increase the width of the groove at the outer peripheral edge of the sheave. This increased groove width may accommodate the fleet angle by limiting the engagement of the rope with the lip of the sheave groove, which may reduce or prevent the rope from hanging up on the sheave groove and intermittently slipping into the groove. As such a smoother operation may be performed and sheave and rope life may be increased.

The sidewalls 136 may extend upwardly along the groove space to a top edge 150. The sidewalls 136, for example, may extend substantially the full remaining height of the groove 132 above the bottom surface 134. For example, where the full height of the groove 132 is measured from the outer peripheral surface of the sheave to the bottom of the bottom surface 134, the sidewalls may extend approximately 50% to 80%, or approximately 60% to 75%, or approximately 67% of the height of the groove 132. The remaining height of the groove may be provided by the bottom surface 134 and the upper lips 138.

The upper lips 138 on each side of the groove 132 may be tangential to an upper end 150 of the sidewall. In other embodiments, the upper lips 138 may extend at angle different than the upper end angle of the sidewalls 136. The upper lips 138 may include a curved surface having a curvature greater than that of the sidewall 136 and may have a flat top surface defining the outermost peripheral surface of the sheave 112. In some embodiments, this outermost peripheral surface may not be flat but, instead, may be curved as the lip 138 may curve away from the sidewall 136 and continue to an outside surface of the base portion 126 of the rope engaging portion 118 of the sheave 112. The curved surface portion of the lip 138 may have a radius ranging from approximately ⅛ inch to approximately ½ inch or from approximately 3/16 inch to approximately ⅜ inch or the curved surface portion of the lip may have a radius of approximately ¼". Still other radii outside or within the ranges mentioned may be provided.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A sheave, comprising:
   a body portion with a circular circumference and defining a center plane;
   a bore extending through the body portion and configured for receiving a shaft and allowing the body portion to rotate in the center plane; and
   a rope groove arranged on the circular circumference, comprising:
   a radiused bottom with a first end and a second end and being concave out relative to the bore, the radiused bottom defining an included angle ranging from approximately 20 degrees to approximately 40 degrees;
   a pair of opposing sidewalls each extending away from the radiused bottom and directly and tangentially away from one of the first and second end to respective upper ends and having a first curved profile with a first curvature, the first curved profile being a radiused profile defined by a radius ranging from approximately 4 inches to approximately 25 inches, the first curved profile further being concave in a direction opposite the radiused bottom; and
   a pair of upper lips each extending directly and tangentially away from respective upper ends of the sidewalls and upward and to an outermost peripheral surface of the sheave, the pair of upper lips having a second curved profile with a second curvature greater than the first curvature and being concave in a direction opposite the radiused bottom,
   wherein, the radiused bottom, sidewalls and upper lips define an overall height of the rope groove and the sidewalls comprise 50% to 80% of the height.

2. The sheave of claim 1, wherein the first curved profile causes each of the sidewalls to increasingly diverge from the center plane as each sidewall extends toward the respective upper ends.

3. The sheave of claim 2, wherein the radiused profile is defined by a radius ranging from approximately 5 ⅝ inches to approximately 16 ¾ inches.

4. The sheave of claim 2, wherein the radiused profile is defined by a radius ranging from approximately 13 inches to approximately 23 ¼ inches.

5. The sheave of claim 2, wherein the radiused profile is defined by a radius ranging from approximately 11 ¾ inches to approximately 20 ½ inches.

6. A block for use in a block and tackle arrangement, the block comprising:
   a housing; and
   a sheave having a bore and arranged within the housing for substantially free rotation, the sheave defining a center plane and having a groove arranged along a circumference thereof, the groove comprising:

a radiused bottom with a first end and a second end and being concave out away from the bore, the radiused bottom defining an included angle ranging from approximately 20 degrees to approximately 40 degrees;

a pair of opposing sidewalls each extending away from the radiused bottom and directly and tangentially away from one of the first and second end to respective upper ends and having a first curved profile with a first curvature, the first curved profile being a radiused profile defined by a radius ranging from approximately 4 inches to approximately 25 inches, the first curved profile further being concave in a direction opposite the radiused bottom; and a pair of upper lips each extending directly and tangentially away from respective upper ends of the sidewalk and upward and to an outermost peripheral surface of the sheave, the pair of upper lips having a second curved profile with a second curvature greater than the first curvature and being concave in a direction opposite the radiused bottom, wherein, the radiused bottom, sidewalls, and upper lips define an overall height of the rope groove and the sidewalls comprise 50% to 80% of the height.

7. The block of claim 6, wherein the first curved profile causes each of the sidewalls to increasingly diverge from the center plane as they extend to respective upper ends.

8. The block of claim 7, wherein the radiused profile is defined by a radius ranging from approximately 5 ⅝ inches to approximately 16 ¾ inches.

9. The block of claim 7, wherein the radiused profile is defined by a radius ranging from approximately 13 inches to approximately 23 ¼ inches.

10. The block of claim 7, wherein the radiused profile is defined by a radius ranging from approximately 11 ¾ inches to approximately 20 ½ inches.

\* \* \* \* \*